(12) United States Patent
Lucente et al.

(10) Patent No.: US 11,982,567 B2
(45) Date of Patent: May 14, 2024

(54) LIGHT FIELD RELAY HAVING A MICROLENS ARRAY, A TRANSDUCER ARRAY, AND AN OUTPUT OPTICS ARRAY

(71) Applicant: Nanohmics, Inc., Austin, TX (US)

(72) Inventors: Mark E. Lucente, Austin, TX (US); Chris W. Mann, Austin, TX (US); John Sarik, Austin, TX (US); Zhongjian Hu, Austin, TX (US)

(73) Assignee: Nanohmics, INC., Austin, TX (US)

( * ) Notice: Subject to any disclaimer, the term of this patent is extended or adjusted under 35 U.S.C. 154(b) by 0 days.

(21) Appl. No.: 18/159,202

(22) Filed: Jan. 25, 2023

(65) Prior Publication Data
US 2023/0243696 A1    Aug. 3, 2023

Related U.S. Application Data

(60) Provisional application No. 63/304,583, filed on Jan. 29, 2022.

(51) Int. Cl.
*G02B 3/00* (2006.01)
*G01J 1/44* (2006.01)

(52) U.S. Cl.
CPC .............. *G01J 1/44* (2013.01); *G02B 3/0056* (2013.01)

(58) Field of Classification Search
CPC ....... G01J 3/28; G01J 3/45; G01J 1/44; G02B 3/00; G02B 6/42; G01S 17/88; G01S 17/89
USPC ................................ 250/216, 214 VT, 214.1
See application file for complete search history.

(56) References Cited

U.S. PATENT DOCUMENTS

| | | | |
|---|---|---|---|
| 7,087,901 B2 * | 8/2006 | Ambuel | G01N 21/359 250/339.01 |
| 10,129,984 B1 | 11/2018 | Lamkin et al. | |
| 10,466,487 B2 | 11/2019 | Blum et al. | |
| 10,483,325 B2 | 11/2019 | So et al. | |
| 10,594,951 B2 | 3/2020 | Lamkin et al. | |
| 2014/0084252 A1 | 3/2014 | Chen et al. | |
| 2019/0043925 A1 | 2/2019 | So et al. | |
| 2019/0103444 A1 | 4/2019 | Lamkin | |

(Continued)

OTHER PUBLICATIONS

Ackerman, MA, "Bringing Colloidal Quantum Dots to Detector Technologies", InforDisplay vol. 36(6): pp. 19-23, (Nov. 17, 2020).

(Continued)

*Primary Examiner* — Que Tan Le
(74) *Attorney, Agent, or Firm* — Murphy Strategic IP; George L. Murphy

(57) ABSTRACT

A light field relay has an array of microlenses, an array of transducers, and an array of output optics. Microlenses focus one or more than one selected portions of an incident light field to separate corresponding transducers. Each corresponding transducer receives and transduces a single portion of focused light and emits the transduced light. Corresponding different output optics substantially collimate the transduced light and emit the substantially collimated light as an emitted light field. The light field relay may collect infrared light in one or more selected portions of an incident light field, transduce the infrared light to visible light, substantially collimate the transduced visible light, and emit a visible light field.

19 Claims, 7 Drawing Sheets

(56) References Cited

U.S. PATENT DOCUMENTS

2019/0246044 A1 8/2019 Lamkin et al.
2019/0246099 A1 8/2019 Lamkin et al.

OTHER PUBLICATIONS

Adelson EH et al., "The Plenoptic Function and the Elements of Early Vision", from Landy M et al., (eds), Computational Models of Visual Processing Ch. 1:pp. 3-20, (1991).

Adelson EH et al., "Single Lens Stereo with a Plenoptic Camera", IEEE Trans Pattern Analysis & Machine Intelligence vol. 14(2): 99-106, (Feb. 1992).

Archambault M, "The Science Behind Lytro's Light Field Technology and Megaray Sensors", www.petapixel.com/2015/06/22/the-science-behind-lytros-light-field-technology-and-megaray-sensors/ (Jun. 22, 2015).

Callicó GM, "Image sensors go broadband", NaturePhotonics vol. 11: pp. 332-333, (Jun. 2017).

Chai J-X et al., "Plenoptic Sampling", SIGGRAPH '00: Proc 27th Conf Computer graphics & interactive techniques, pp. 307-308, (Jul. 2000).

Charbonneau M et al., "Eyepiece Focus and Vergence/Accommodation Conflict: Implications for night-vision devices", J SID, vol. 18(5): pp. 376-385, (2010).

Chen WT et al., "A broadband achromatic metalens for focusing and imaging in the visible", NatNanotech, vol. 13: pp. 220-226, (Mar. 2018).

Estakhri NM et al., "Wave-front Transformation with Gradient Metasurfaces", PhysRvwX vol. 6(041008): pp. 041008-1-17, (Oct. 14, 2016).

Estakhri NM et al., "Visible Light, Wide-Angle Graded Metasurface for Back Reflection", ACS Photonics vol. 4: pp. 228-235, (Jan. 23, 2017).

Franke, D et al., "Continuous injection synthesis of indium arsenide quantum dots emissive in the short-wavelength Infrared", NatureComm vol. 7(12749): pp. 1-9, (Nov. 11, 2016).

De Gaspari D et al., "The Night Glows Brighter in the Near-IR", PhotonicsSpectra vol. 46(4): pp. 62-65, (Apr. 2012).

Goossens et al., "Broadband image sensor array based on graphene-CMOS integration", Nature Photonics vol. 11: pp. 366-371, (May 29, 2017).

Gorlatova M et al., "Movers and Shakers: Kinetic Energy Harvesting for the Internet of Things", IEEEJSelctdComm vol. 33(8) pp. 1624-1639 (Jan. 14, 2015).

Hany R et al., "Recent advances with optical upconverters made from all-organic and hybrid materials", Science and Technology of Advanced Materials vol. 20(1): pp. 497-510, (May 28, 2019).

Hu G et al., "Topological polaritons and photonic magic angles in twisted α-MoO 3 bilayers", Nature vol. 582: pp. 209-213 & Supp, (Jun. 11, 2020).

Hu Z et al., "Intrinsic Exciton Photophysics of PbS Quantum Dots Revealed by Low-Temperature Single Nanocrystal Spectroscopy", NanoLett vol. 19(12), pp. 8519-8525, (Nov. 12, 2019).

Joo, W-J et al., "Metasurface-driven OLED displays beyond 10,000 pixels per inch", Science vol. 370(6515): pp. 459-463, (Oct. 23, 2020).

Kim C-H et al., "Graphene-organic hybrid electronics", JMatChemC vol. 5: pp. 4598-4613, (Apr. 28, 2017).

Kim DY et al., "Multi-spectral imaging with infrared sensitive organic light emitting diode", Nature Sci Reports vol. 4 (5946): pp. 1-5, (Aug. 5, 2014).

Liu Z et al., "Focusing Surface Plasmons with a Plasmonic Lens", NanoLett vol. 5(9): pp. 1726-1729, (Jul. 29, 2005).

Konstantatos G, et al., "Hybrid graphene-quantum dot phototransistors with ultrahigh gain", NatNanotechLett vol. 7: pp. 363-368, (May 6, 2012).

McEntire BJ et al., "Mass requirements for helicopter aircrew helmets", U.S. Army Aeromedical Research Laboratory, Fort Rucker, AL Reprint Report No. AD-A328597 (1998).

Moreels, I et al., "Transmission of a quantum-dot-silicon-on-insulator hybrid notch filter", JOptSocAm B vol. 26(6): pp. 1243-1247 (May 26, 2009).

Ra'di Y et al., "Metagratings: Beyond the Limits of Graded Metasurfaces for Wave Front Control", PhysRevLett vol. 119(067404) pp. 1-6, (Aug. 10, 2017).

Sabri SS et al., "Graphene field effect transistors with parylene gate dielectric", ApplPhysLett vol. 95(242104): pp. 242104-1-3, (Dec. 14, 2009).

Tachibana H et al., "Tunable Full-Color Electroluminescence from All-Organic Optical Upconversion Devices by Near-Infrared Sensing", ACS Photonics vol. 4: pp. 223-227, (Jan. 26, 2017).

Yu H et al., "Sub-Band Gap Turn-On Near-Infrared-to-Visible Up-Conversion Device Enabled by an Organic-Inorganic Hybrid Perovskite Photovoltaic Absorber", ACSApplMaterInterfaces vol. 10(18): pp. SuppInfo 1-6, (Apr. 17, 2018).

Zou S-J et al., "Recent advances in organic light-emitting diodes: toward smart lighting and displays", MaterChemFront. vol. 4(3): pp. 788-820, (Dec. 17, 2019).

\* cited by examiner

LIGHT FIELD RELAY HAVING A
MICROLENS ARRAY, A TRANSDUCER
ARRAY, AND AN OUTPUT OPTICS ARRAY

REFERENCE TO RELATED APPLICATIONS

This application claims the benefit of U.S. Provisional Application No. 63/304,583, filed on Jan. 29, 2022, which is incorporated by reference herein in its entirety.

TECHNICAL FIELD

The disclosure relates to a light field relay for receiving and transmitting light, to devices that incorporate the light field relay, and to methods for making and using the light field relay. More specifically, the disclosure relates to a microphotonic light field relay that enables direct viewing of a transmitted light field.

DESCRIPTION

A light field is a function that describes both the amount and the direction of radiation propagating through every point in a space or surface. A light field relay may collect a portion of an incident light field from a field of view (FoV) and reconstruct a replica of it, frequently on a display or image plane.

In some embodiments described herein a light field relay is configured to gather a selected portion of an incident light field, to convert, i.e., transduce, light in the selected portion having selected wavelengths to light having different wavelengths, and to emit the transduced light as an emitted light field in such a manner that the irradiance and direction of travel of light in the selected portion of the incident light field are substantially preserved in the emitted light field. In some embodiments, the irradiance of light in the selected portion that is converted may be amplified in the emitted light field. The light field relay accomplishes the conversion (transduction) of the incident light field to the emitted light field without an intermediate image plane, such as for example a phosphor screen, and without the necessity to re-image a scene.

In some aspects, the light field relay may provide wider fields of view (FoV) than are available with current systems, may be considerably smaller and lighter than traditional systems, may have improved spectral sensitivity allowing for use across a large range of spectral bands, and may provide more accurate depth queues than do traditional systems. In many embodiments, light field relay design and materials enable a compact system that may be less expensive to produce and more adaptable to various form factors than are available to current direct-view systems, enabling more applications than can be addressed by current systems. In some embodiments, a light field relay may be incorporated into a night vision system. For example, night vision eyewear may comprise a light field relay. Embodiments of a night vision system described herein provide several advantages and improvements over current systems, including compact form factor, light weight, wide fields of view, low power consumption and lighter power supplies, increased movement in the field, and compatibility with conversion of infrared (IR) light from a large region of the IR spectrum to visible (VIS) light.

In some embodiments, a light field relay comprises a plurality of microlenses and a plurality of transducers, wherein each microlens in the plurality of microlenses is coupled to a corresponding different subset of the plurality of transducers and is configured to focus one or more selected portions of an incident light field to the corresponding different subset, and wherein each transducer in the corresponding different subset is positioned and configured to receive and transduce light from a single selected portion of the one or more selected portions of the incident light field focused by the coupled microlens and comprises a detector electrically coupled to an emitter, the detector being positioned between the coupled microlens and the emitter. The light field relay also comprises a plurality of output optics, each output optic in the plurality of output optics comprising a collimating lens, wherein each transducer in the corresponding different subset is associated with a corresponding different output optic in the plurality of output optics, the corresponding different output optic being positioned to receive transduced light from the emitter of the associated transducer and configured to substantially collimate the received, transduced light and to emit the substantially collimated light, and wherein the substantially collimated, emitted light has a direction of travel that is substantially the same as the direction of travel of the single selected portion and has an irradiance that is amplified in comparison to the irradiance of the single selected portion. The substantially collimated light emitted by the output optics of the light field relay is an emitted light field. In some aspects, the one or more selected portions of the incident light field focused to the corresponding different subset of transducers comprises IR light, and the substantially collimated light emitted by the associated corresponding different output optic comprises VIS light.

In some embodiments, the detector of a light field relay may comprise a layer of graphene and in some aspects may further comprise a layer of nanocrystal sensitizers coupled to the graphene layer. In some embodiments, an emitter may be a light emitting diode (LED) that comprises inorganic semiconducting materials, i.e., the LED is an inorganic LED. In some aspects, an emitter may be an organic LED (OLED). In some embodiments, a light field relay may comprise a graphene detector, an OLED emitter, and optionally, nanocrystal sensitizers coupled to the graphene detector. In some aspects, the nanocrystal sensitizers may be configured to absorb selected wavelengths of IR light. In some embodiments, a light field relay may comprise an emitter that further comprises a plasmonic lens, which may also assist with collimating transduced light. In some aspects, an output optic comprises a conventional collimating lens. In some embodiments, an output optic comprises a collimating lens that may be a dielectric meta-optic collimating lens, which in some embodiments, may comprise an array of subwavelength structures, which may be substantially cylindrically shaped, subwavelength structures. Light field relays may comprise baffles positioned to reduce backscatter of light and prevent crosstalk among optical elements.

The specification is most thoroughly understood in light of the teachings and references cited within the specification. It should be understood that the drawings, detailed description, and specific examples, while indicating specific embodiments of the invention, are given by way of illustration only, since various changes and modifications within the spirit and scope of the invention will become apparent from this detailed description to those skilled in the art. Any section headings used herein are for organizational purposes only and are not to be construed as limiting the subject matter described. All documents, or portions of documents, cited in this application, including but not limited to patents, patent applications, articles, books, and treatises, are hereby expressly incorporated by reference in their entirety. To the extent publications and patents or patent applications incorporated by reference contradict the invention contained in the specification, the specification will supersede any contradictory material.

BRIEF DESCRIPTION OF THE DRAWINGS

The following drawings form part of the specification and are included to further demonstrate certain embodiments of the invention. Embodiments may be better understood by reference to one or more of these drawings in combination with the detailed description of specific embodiments presented herein. Drawings are not necessarily drawn to scale. For purposes of clarity, every element that may be part of a light field relay embodiment may not be depicted in every drawing. The use of a letter following an element number is for descriptive purposes only. For example, 114a and 114b each refer to substantially collimated light 114 transmitted by light field relay 100, but as an aid in understanding the description of the figure, may refer to different portions of substantially collimated and transmitted light, having different directions of travel and/or irradiance. For purposes of clarity and for understanding embodiments of the invention, the relative sizes of structural elements may not necessarily be reflective of actual relative sizes in embodiments of the invention.

DETAILED DESCRIPTION

Reference will now be made in detail to certain exemplary embodiments, some of which are illustrated in the accompanying drawings. Certain terms used in the application are first defined. Additional definitions are provided throughout the application.

The terms "about" or "approximately" are defined as being close to, as would be understood by one of ordinary skill in the art. In some embodiments, "about" or "approximately" may mean within 10%, within 5%, within 1%, or within 0.5% of a value. As used herein. "substantially" is meant to mean "approximately", not necessarily "perfectly". In some aspects, "substantially" may mean "partially, but not wholly". The term "substantially" and its variations may mean within 10%, within 5%, within 1%, or within 0.5% of a value.

As used herein, the term "equal" and its relationship to values or characteristics that are "substantially equal" would be understood by one of skill in the art. Typically, "substantially equal" and "substantially" can mean that the values or characteristics referred to may be equal or may not be mathematically equal but would function as described for embodiments in the specification and/or claims. All size ranges described herein are inclusive of the lower and upper limit values.

As used herein, the phrases "at least one of A or B" and "at least one of A and B" are each meant to include one or more of only A, one or more of only B, or any combination and number of A and B. Any combinations having a plurality of one or more than one of any of the elements or steps listed are meant to be included by the use of these phrases. For example, the combinations of 1A and 1B, 2A and 1B, 1A and 2B, and 2A and 2B are included. Similar phrases for longer lists of elements or steps e.g., "at least one of A or B or C", "at least one of A and B and C", "one or more of A and B and C", and "one or more of A or B or C" are also contemplated to indicate one or more of either element or step alone or any combination including one or more of any of the elements or steps listed.

In some embodiments, the compositions and methods for their use can "comprise," "consist essentially of," or "consist of" any of the compositions or steps disclosed throughout the specification. Compositions of the invention can be used to achieve methods of the invention.

Figure 1A:
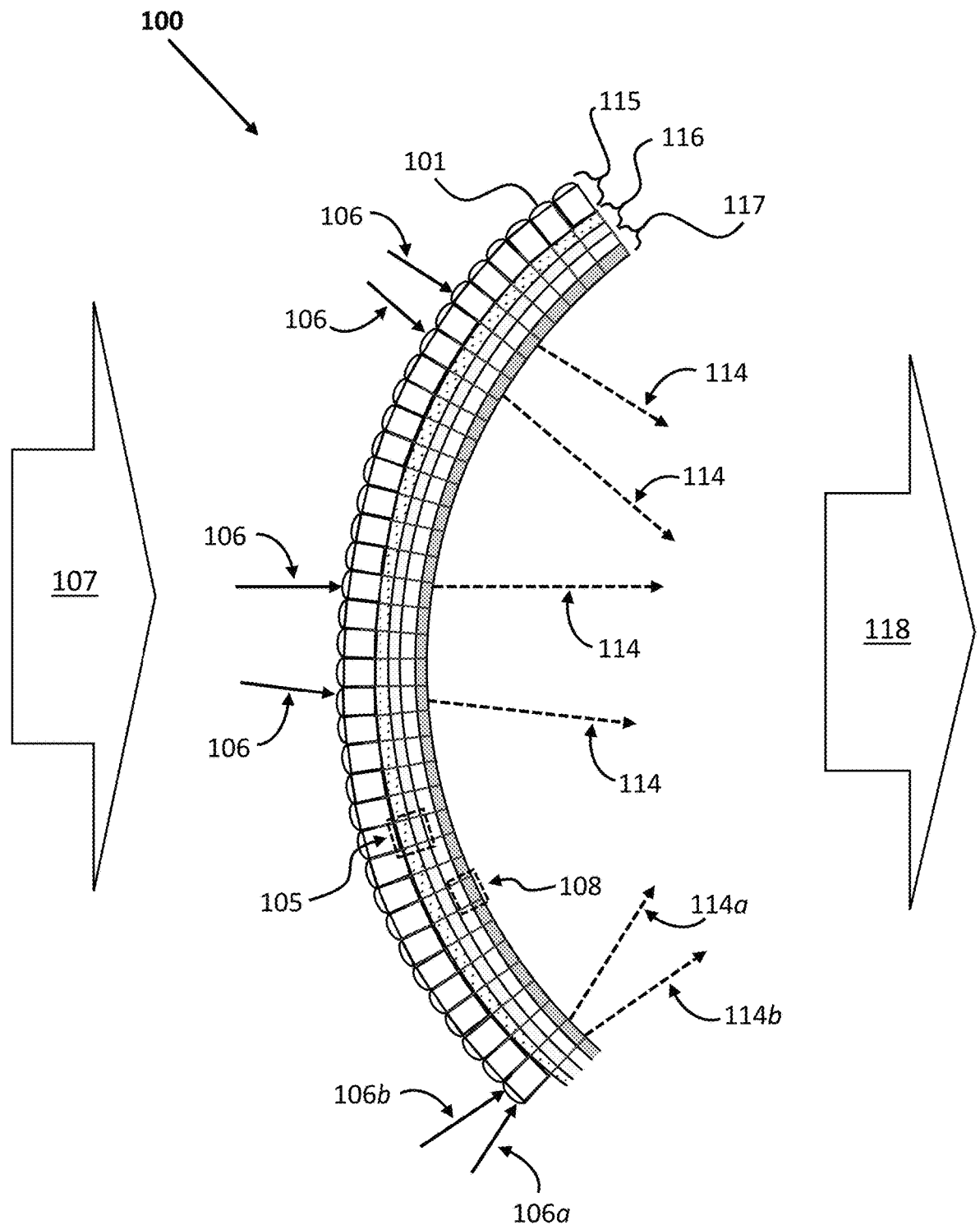
FIGS. 1A-1C show schematic, side view cross sections of an exemplary embodiment of a light field relay.
Figure 1B:
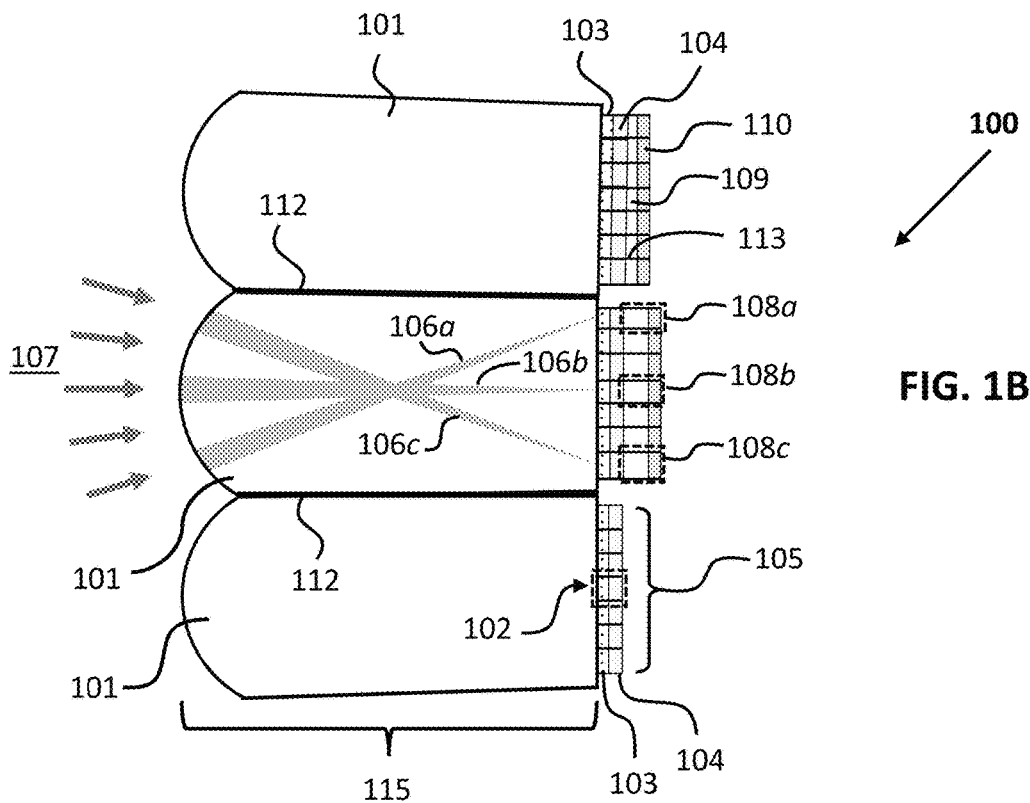
Figure 1C:
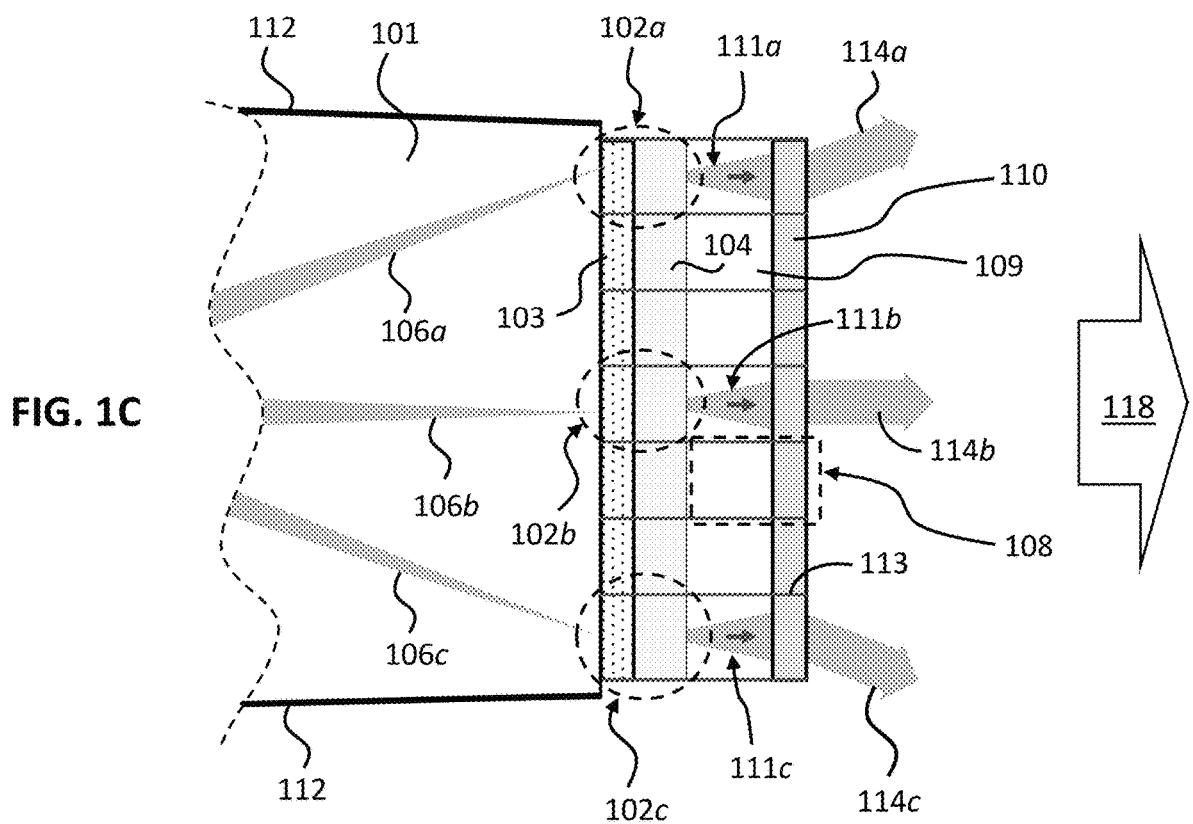

FIGS. 1A-1C show schematic, side view cross sections of an exemplary embodiment of a light field relay. FIG. 1A shows a schematic, side view cross section of an exemplary embodiment of a light field relay 100. FIG. 1B shows an enlarged side view of a cross section of an embodiment of light field relay 100 having three microlenses 101 and associated elements. FIG. 1C shows an enlarged section of a portion of a single microlens 101 and associated elements. In some embodiments, light field relay 100 comprises microlens array 115 comprising a plurality of microlenses 101 and transducer array 116, comprising a plurality of transducers 102 (FIGS. 1A-1B). In some aspects, transducer array 116 may be mechanically coupled to (i.e., in physical contact with) the back side of microlens array 115. However, in some aspects microlens array 115 and transducer array 116 are not mechanically coupled. In many embodiments, each microlens 101 is physically coupled to and in contact with a corresponding different subset 105 of transducers 102 in transducer array 116. As used herein, a microlens 101 that is coupled to a corresponding different subset 105 of transducers 102 is not coupled to any transducers outside of that subset and the transducers in the corresponding different subset are coupled only to that microlens and are not coupled to other microlenses. Each transducer 102 in a corresponding different subset 105 comprises a detector 103 coupled to an emitter 104, as is shown in detail in FIGS. 1B-1C. Typically, detector 103 and emitter 104 are electrically coupled. In some aspects, detector 103 is mechanically coupled to emitter 104, but this is not a requirement. Detector 103 is positioned between microlens 101 and emitter 104 (FIGS. 1B-1C). In some embodiments, each microlens 101 is configured to focus one or more (i.e., at least one) selected portions 106 (e.g., 106a, 106b, 106c in FIGS. 1B-1C) of an incident light field 107 to a corresponding different subset 105 of transducers 102, such that each of the one or more selected portions 106a, 106b, 106c of incident light field 107 is focused to a separate, transducer 102a, 102b, 102c respectively, in the corresponding different subset 105. Selected portion 106 is focused to detector 103 of transducer 102, where detector 103 absorbs the focused, selected portion 106 and directly drives emitter 104, to which it is electrically coupled, as a function of the irradiance of the incident radiation in selected portion 106. In many aspects, each separate transducer 102 in the corresponding different subset 105 is positioned and configured to receive and transduce light from one of the selected portions 106 focused by the coupled microlens 103.

As used herein, the "front side" of an element is that side through which light in selected portion 106 enters the element, and the "back side" of an element refers to that side of the element that is opposite the front side of the element and through which light in selected portion 106 exits the element. For example, the front side of microlens 101 and microlens array 115 is that side through which selected portion 106 of light field 107 enters microlens 101. The back side of microlens 101 and microlens array 115 is that side of the elements through which selected portion 106 exits microlens 101 and microlens array 115. The front side of transducer 102 is the side through which selected portion 106 enters transducer 102 after being focused by microlens 101.

Light field relay 100 further comprises a plurality of output optics 108 that are part of output optics array 117 (FIGS. 1A-1C), wherein each transducer 102 in the corresponding different subset 105 is associated with a single corresponding different output optic 108. In the exemplary embodiments shown here (FIGS. 1B-1C), each microlens 101 is coupled to a corresponding different subset 105 of transducers 102 and each transducer 102 (102a, 102b, 102c) in subset 105 is associated with one corresponding different output optic 108 (108a, 108b, 108c, respectively). As used herein, a transducer 102 that is associated with a single corresponding different output optic 108 is not associated with any other output optic 108 and the corresponding different output optic 108 is not associated with any other transducer 102. (To clearly indicate selected subset 105, output optics 108 are not depicted with the microlens 101 and selected subset 105 shown at the bottom of FIG. 1B). It is to be noted that the numbers of transducers shown in FIGS. 1A-1C are selected only for ease of viewing and description. In some aspects, a single microlens 101 may be coupled to a subset 105 of transducers 102 that can be arranged in any of a variety of positions at the back side of microlens 101. For example only, a single microlens 101 may be coupled to a subset 105 of nine transducers 102 that may be positioned in a 3×3 array, or a single microlens 101 may be coupled to a subset 105 of 400 transducers 102 that could be arranged in a 20×20 array. In some aspects, a single microlens 101 may be approximately 0.1 mm wide and coupled to a subset 105 that is a 7×7 array of transducers 102. In some embodiments, the distance from the front side of microlens 101 to the back side of output optic 108 is less than or equal to about 1 mm.

As shown in FIGS. 1B-1C, in some aspects, each corresponding different output optic 108 is positioned to receive transduced light 111 from emitter 104 of an associated transducer 102 and is configured to substantially collimate the received, transduced light 111, and to emit the substantially collimated light 114, wherein the substantially collimated, emitted light 114a, 114b, 114c emitted by the corresponding different output optic 108a 108b, 108c respectively, has a direction of travel that is substantially the same as the direction of travel of the single selected portion 106a, 106b, 106c respectively, of incident light field 107 focused by coupled microlens 103 to the associated transducer 102 (102a, 102b, 102c, respectively), and has an irradiance that is amplified in comparison to the irradiance of the focused, selected portion 106a, 106b, 106c received by the associated transducer 102. In many aspects, the irradiance of substantially collimated light 114a, 114b, 114c emitted by corresponding different output optic 108a 108b, 108c respectively, is a function of the irradiance of selected portion 106a, 106b, 106c respectively, in incident light field 107.

In this exemplary embodiment then, light field relay 100 is configured (i) to gather a plurality of selected portions 106a, 106b, 106c of incident light field 107 and focus selected portions 106a, 106b, 106c to transducers 102a, 102b, 102c respectively, in subset 105, (ii) to convert light of selected wavelengths, present in selected portions 106a, 106b, 106c, to transduced light 111a, 111b, 111c respectively, having wavelengths that are different than those in selected portions 106a, 106b, 106c, (iii) to substantially collimate transduced light 111a, 111b, 111c, and (iv) to emit substantially collimated light 114a, 114b, 114c respectively, as emitted light field 118. In many aspects, the direction of travel of substantially collimated light 114a, 114b, 114c emitted by a corresponding output optic 108a 108b, 108c respectively, is substantially the same as the direction of travel of light in the single selected portion 106a, 106b, 106c respectively, that is focused to the associated transducer 102a, 102b, 102c respectively, in the corresponding different subset 105 of transducers 102, the irradiance of substantially collimated light 114a, 114b, 114c emitted by a corresponding output optic 108a 108b, 108c respectively, is amplified in comparison to the irradiance of the single selected portion 106a, 106b, 106c focused to the associated transducer 102a, 102b, 102c respectively, and the amount of substantially collimated light 114 in emitted light field 118 is a function of the irradiance of light in the selected portion 106 in incident light field 107.

Microlens 101 can be made from any of a variety of materials that are transparent to light in selected portion 106 that is to be focused to transducer 102. Exemplary materials include, by way of example only, glass and plastic. In some applications, it may be preferred that selected portion 106 focused to transducer 102 includes light from a selected, specific region of the EM spectrum, such as for example only, one or more bands in the IR region (e.g., NIR, SWIR, LWIR). In these types of applications, materials that are especially effective for transmitting IR light, such as ZnSe and ZnS, can be useful materials for microlens 101. In some embodiments, the front side of microlens 101 can be coated with an IR-pass filter, such as by way of example only a sputtered Si thin film, so as to reduce or block the entry of incident VIS light or of light from another selected region or regions of the electromagnetic spectrum from light field 107 while allowing the passage of IR light.

In some embodiments, adjacent microlenses 101 may be separated by an opaque baffle 112 for isolating each microlens 101 so as to reduce or eliminate scattering of light between or among microlenses 101 and transducers 102 and to reduce or eliminate backscattering of light from the back side of a microlens 101. When in operation, selected portion 106 that has entered microlens 101 and is being focused to a selected subset 105 of transducers 102 may be prevented from scattering to an adjacent microlens 101 and/or subset 105 of transducers 102 by incorporating baffles 112 between microlenses 101 in microlens array 115. In some aspects, an array of baffles 112 may be etched into microlens array 115 between adjacent microlenses 101 to reduce or eliminate crosstalk among neighboring microlenses 101. In some aspects, baffles 112 may be useful for reducing or eliminating the collection of light that is outside of a preferred selected range of angles for selected portion 106. Additional information on range of angles and angular sample size can be found below.

In a similar manner, one or more opaque transducer-output optic baffles 113 may be positioned between adjacent transducers 102, between adjacent subsets 105 of transducers, and/or between adjacent output optics 108 for reducing crosstalk between and among those elements. In some aspects, transducer-output optic baffle 113 may extend from a backside of microlens 101 to a backside of output optic 108. In many aspects transducer-output optic baffle 113 may be made of polymer or any material useful for reducing light scatter and compatible with light field relay 100 performance and manufacture.

Each microlens 101 in microlens array 115, collects at least one selected portion 106 of incident light field 107 from a portion of a field of view (FoV) that arrives at microlens array 115 from a specific, limited range of incident angles. The size range of the FoV from which light field relay 100 can collect incident light field 107 may be scaled according to the size and shape of microlens array 115 and, by way of example, may be increased or decreased by increasing or decreasing respectively, the size of microlens array 115. In some aspects, adjusting the shape or configuration of light field relay 100 may be used to adjust the FoV. In some aspects, microlens array 115 may have a planar configuration. In many aspects, microlens array 115 is configured to be curved, such as in the embodiment shown in FIG. 1A, which may be useful for collecting light from a relatively wider field of view (FoV).

In many embodiments, microlens 101 focuses light arriving from a specific, selected range of angles to a specific, separate transducer 102 in subset 105. It is to be noted that "range of angles" may also be considered to be an "angular sample size" and includes both the horizontal range of angles and the vertical range of angles. In some aspects, the values of the horizontal range of angles from which light is focused by microlens 101 may be different from the values of the vertical range of angles from which light is focused by microlens 101. A range of angles, from which selected portion 106 is focused by microlens 101, may be adjusted by adjusting selected parameters of microlens 101 and/or transducer 102. By way of example only, in some aspects adjusting one or more of the thickness, curvature, diameter, focal length, refractive index or other geometrical parameter of microlens 101 may be useful for adjusting the angular sample size, i.e., the range of horizontal and vertical angles from which light is focused by microlens 101 to transducer 102. In some embodiments, microlens 101 may have a front side that is curved such as the microlenses 101 shown in FIG. 1A that have a planoconvex shape. However, microlens 101 need not have a curved front side. Flat lenses (e.g., a diffractive lens) and metalenses can also be useful configurations for microlens 101. Also by way of example, adjusting focal distance (F) and width (w) of detector 103 can be used to define a range of angles as roughly arctan(w/F). In some aspects, accounting for the effects of diffraction and higher order geometrics may be useful for adjusting angular sample size.

In some embodiments, configuring light field relay 100 so that selected portion 106 is directed from a relatively smaller range of angles can allow for higher density of angular sampling of incident light field 107, which can be useful for producing an emitted light field 118 with a relatively higher resolution, thereby enhancing resolution of a perceived image of substantially collimated light 114 and emitted light field 118. In some aspects, it is preferred that the angular range/angular sample size of selected portion 106 directed to a single transducer 102 be at least about 0.1 degrees (0.1°), be from about 0.1° to about 1°, or be from about 1° to about five degrees (5°).

Figure 2:
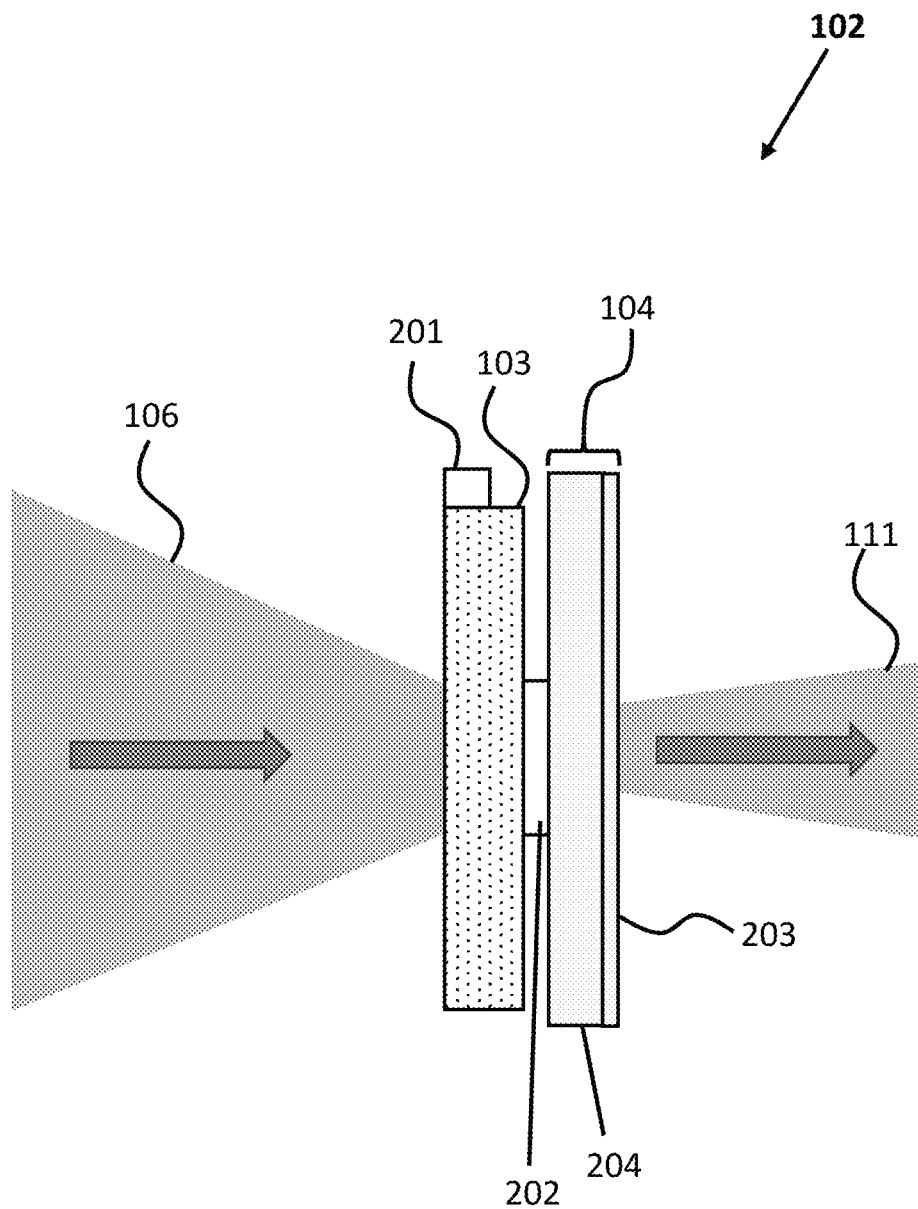
FIG. 2 is a schematic illustration of a side view, cross section of an exemplary embodiment of a single transducer.

FIG. 2 is a schematic illustration of an exemplary embodiment of a single transducer 102. Selected portion 106 is focused by microlens 101 to a single transducer 102. Each transducer 102 in a subset 105 operates independently and is responsible for transducing light in one selected portion 106 and emitting transduced light 111 to a single corresponding different output optic 108. Selected portion 106 arrives at and is absorbed by detector 103. Typically, detector 103 and emitter 104 are electrically coupled. In some aspects, detector 103 and emitter 104 may be mechanically coupled via intervening electrical connector 202, such that detector 103, electrical connector 202, and emitter 104 are integrated. In the exemplary embodiment of FIG. 2, detector 103 is electrically connected to electrical conductor 201, and detector 103 and emitter 104 are electrically coupled by intervening electrical connector 202. In some aspects, power may be supplied to transducer 102 via a battery connected to electrical conductor 201.

In some embodiments, electrical connector 202 may comprise a conductor and other circuitry, and in some aspects circuitry may comprise one or more transistors. In some aspects, one or more transistors in electrical connector 202 may be electrically connected to emitter 104. A transistor or other circuitry electrically connected with emitter 104 may be used to provide gain and/or tailor the response of emitter 104 to selected portion 106 of incident light field 107.

In operation, transduced light 111 is passed by emitter 104 to output optic 108. In some embodiments, emitter 104 can comprise one or more elements that may contribute to converting selected portion 106 to transduced light 111, condensing transduced light 111, and/or emitting transduced light 111. In some aspects, it is preferred that the emission area of emitter 104 be relatively small so as to assist in the collimation of transduced light 111 by output optic 108. As such, light emitting diode (LED) emitters may, in some embodiments, have diameters of from about 5 μm to about 8 μm. In the embodiment shown in FIG. 2, emitter 104 comprises light-generating element 204 and plasmonic lens 203 positioned at the back side of light-generating element 204. Plasmonic lens 203 is an optional part of emitter 104. In this aspect, plasmonic lens 203 is mechanically coupled to light-generating element 204 forming emitter 104, and plasmonic lens 203 functions to condense and enhance emission of transduced light 111 passed by light-generating element 204. Condensing transduced light 111, passed by emitter 104, with plasmonic lens 203 may be useful for improving collimation of the light by output optic 108. In some aspects, plasmonic lens 203 may be a metal optical metasurface that uses surface plasmon polaritons (SPPs) to condense and direct transduced light 111, passed by light-generating element 204, to a confined, central spot. Phase-matching conditions allow the light to exit plasmonic lens 203 to output optic 108, where the expanding cone of transduced light 111 can then be collimated by collimating lens 110. In some aspects, plasmonic lens 203 may be a series of concentric conductive metal rings on a dielectric thin film. In some embodiments, one or more other elements may be useful for enhancing emission of transduced light 111. For example, an index-matching surface may also increase light emission efficiency. By way of example only, light-generating element 204 may comprise an illuminator and a light modulator to function as emitter 104 in a manner similar to the functioning of an LCD.

Figure 3:
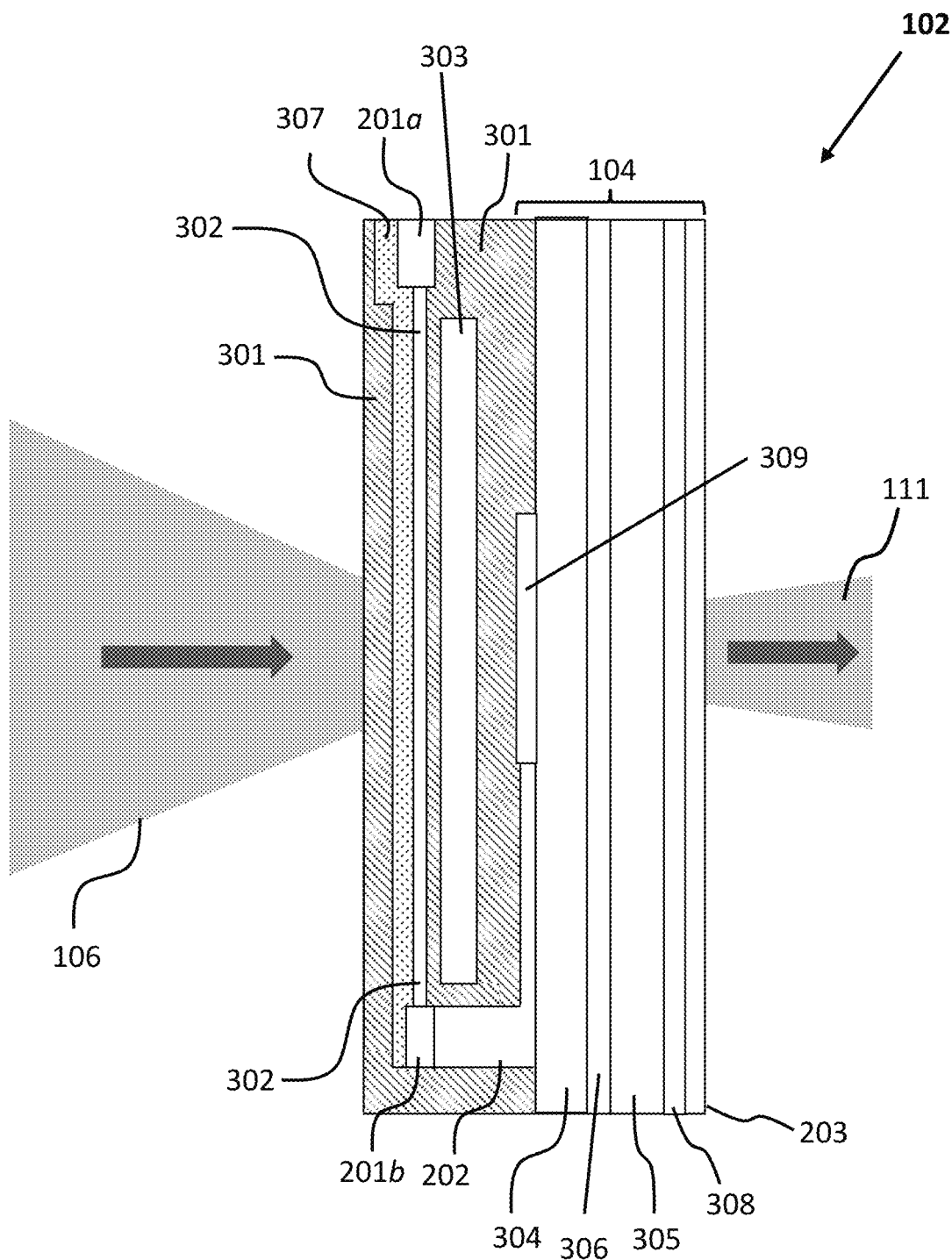
FIG. 3 shows a schematic illustration of a side view, cross section of an exemplary embodiment of a transducer comprising an OLED.

FIG. 3 shows an exemplary embodiment of a transducer 102. In this embodiment, light field relay 100 comprises detector 103 that itself comprises a graphene layer 307 and a layer of nanocrystal (NC) sensitizers 302. In some embodiments, graphene layer 307 may be an uncooled, sensitized graphene IR photodetector. Here, graphene layer 307 is a single layer that functions as a high-speed carrier transport channel in direct contact with the layer of (NC) sensitizers 302. NC sensitizers 302 are an optional feature of detector 103 and in some aspects may be positioned between microlens 101 and graphene layer 307 or may be positioned between graphene layer 307 and emitter 104. NC sensitizers 302 may be particularly efficient for absorbing broadband radiation from one or more regions of the electromagnetic spectrum in selected portion 106 that is focused to detector 103. Also in this embodiment, insulating layer 301 surrounds gate conductor 303 and part of insulating layer 301 is positioned to be between graphene layer 307 of detector 103 and microlens 101. Microlens 101 (FIGS. 1B-1C) is not depicted in this enlargement. Selected portion 106 is focused by microlens 101 to its backside, which is adjacent to insulating layer 301. Electrical conductors 201a and 201b serve as detector drain and source.

In some embodiments, emitter 104 may be an LED emitter, which in some aspects may be an organic light-emitting diode (OLED) as in FIG. 3. In this embodiment, OLED emitter 104 comprises conductive anode 309, hole transporting layer 304, emissive layer 306, electron transport layer 305, and transparent conducting cathode 308. OLED emitters may have any of a variety of material layers. In some aspects, transducer 102 may include layers and components that perform multiple functions. By way of example only, OLED conductive anode 309 may also function as an optical reflector, increasing OLED efficiency and irradiance of emitted light 114.

In some embodiments, light field relay 100 may be configured for focusing one or more selected portion 106 of incident light field 107 to transducer 102, the one or more selected portion 106 comprising IR light, for transducing the IR light to light 111 that is VIS light, and for substantially collimating and emitting the VIS light such that the substantially collimated VIS light 114 contributes to emitted light field 118 of VIS light. Substantially collimated VIS light 114 in emitted light field 118 has a direction of travel that is substantially the same as the direction of travel of the at least one selected portion 106 of IR light that is focused to the single, separate transducer 102 and has an irradiance that is amplified in comparison to the irradiance of the at least one selected portion 106 of IR light.

In some embodiments transducer 102, configured for transducing IR light to VIS light, comprises detector 103, detector 103 comprising graphene layer 307 and NC sensitizers 302, and comprises emitter 104 that is an LED. Graphene in layer 307 with its high charge carrier mobility may be especially useful as an uncooled, high-gain photodetector. NC sensitizers 302 may be selected for absorbing IR photons from selected portion 106 that is focused by microlens 101 and transferring charge to graphene in graphene layer 307, which changes conductivity to drive current to the OLED or LED emitter 104. Generated charge carriers have a characteristic recombination lifetime, typically about 5 ms, during which charge circulates in graphene multiple times providing detector gain. In some aspects, NC sensitizers 302 may be selected for increasing light absorption efficiency where multiple charge carriers are created from one incident photon, thereby providing photoconductive gain. In some aspects, higher gain may also be achieved by increasing charge carrier recombination lifetime, which can be achieved in some aspects, by adjustment of chemical ligand coatings on NC sensitizers 302 and/or the thickness of the NC sensitizers 302 layer, which also enhances charge transfer efficiency. Adjusting bias with gate conductor 303 may be useful for controlling detector gain, for example to provide large dynamic range.

NC sensitizers 302 may be configured as one or more than one of nanoparticles, colloidal quantum dots, or other thin film structures configured for effective broadband IR absorption. In some aspects, NC sensitizers 302 may be selected for their ability to absorb light in specific IR spectral bands. The composition of and physical parameters (e.g., shape, size, concentration, pattern structure, film thickness) of NC sensitizers 302 can be adjusted to enhance light absorption in selected, specific regions of the electromagnetic spectrum and to optimize charge transfer efficiency. For example, light field relay 100 may comprise PbS and/or PbSe NC sensitizers 302 configured for broadband absorption of light having wavelengths from about 0.75 μm to about 1.8 μm or configured for broadband absorption of light having wavelengths from about 0.75 μm to about 3.0 μm in the NIR and short-wave IR (SWIR) spectral bands. In some aspects, useful NC sensitizers 302 that can enhance absorption of IR light up to the long-wave IR (LWIR) spectral region may include by way of example only NC sensitizers comprising InAs and/or $Ti_2O_3$. Absorbance spectra of some useful NC sensitizers are described in the art (Moreels, et al., J. Opt. Soc. Am. B, 2009, 26(6):1243; Ackerman, Information Display, 2020, 36(6):19).

Figure 4:
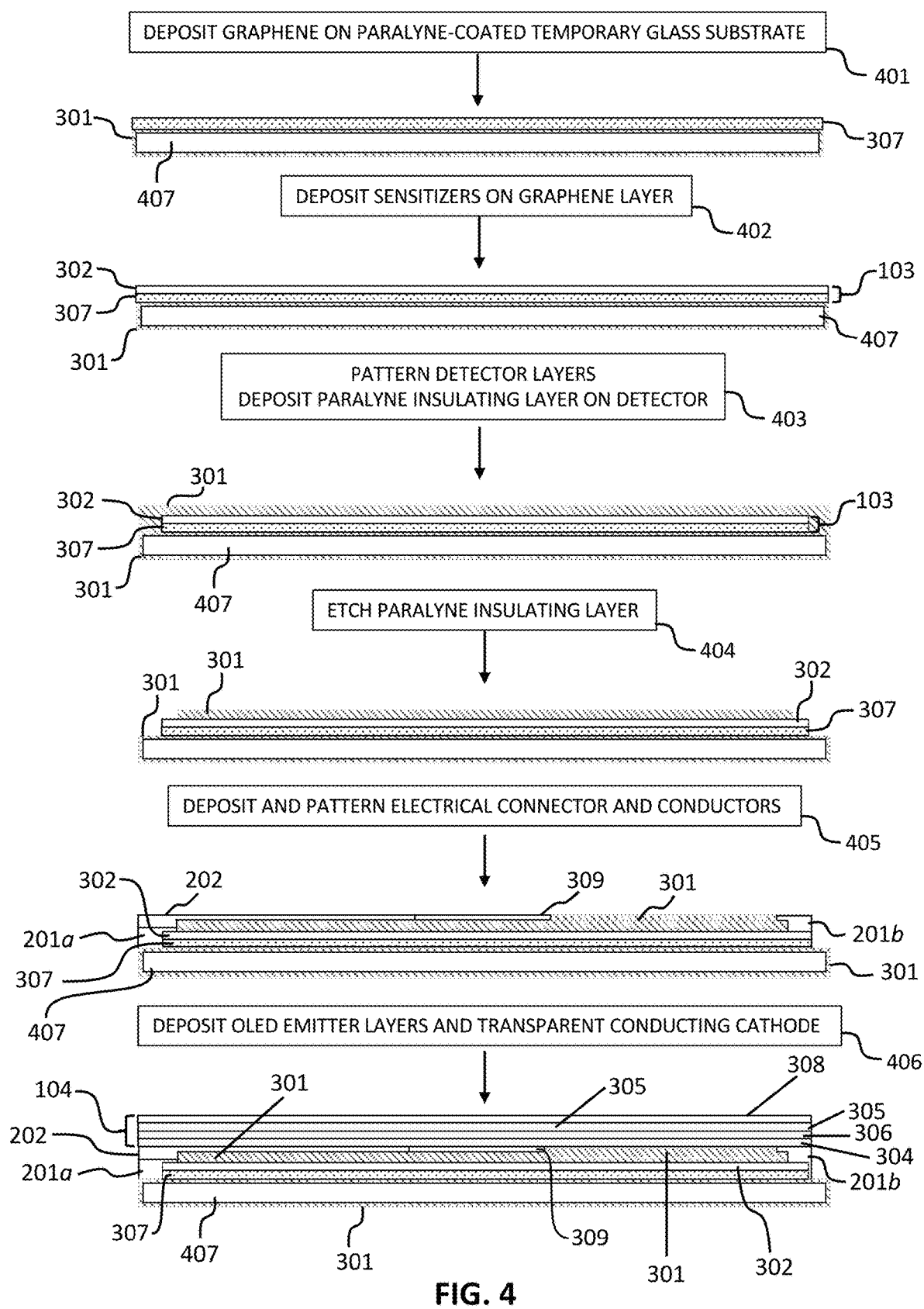
FIG. 4 is a schematic showing steps of one embodiment for fabrication of a transducer.

In general, fabrication of light field relay comprises the use of standard lithographic techniques for semiconductor microfabrication. FIG. 4 is a schematic showing selected steps of one embodiment for fabrication of transducer 102. Here, transducer 102 comprises detector 103, comprising a layer of graphene 307 and NC sensitizers 302, and OLED emitter 104 comprising layers 304, 305, 306, conductive anode 309, and transparent conducting cathode 308. At step 401, a layer of graphene 307 is deposited on a parylene-coated temporary glass substrate 407. Parylene insulating layer 301 on glass substrate 407 should be adequately thick so as to provide electrical insulation and adequately thin so as to remain transparent. In some aspects, a parylene film that is about 40 nm thick can fulfill these requirements. Parylene insulating layer 301 in direct contact with graphene in graphene layer 307 can assist in maintaining a relatively higher charge carrier mobility in graphene 307 layer. At step 402, NC sensitizers 302 are deposited as a layer on the graphene layer 307. At step 403, the detector graphene layer 307 and NC sensitizers 302 are patterned and a second parylene insulating layer 301 about 40 nm in thickness is deposited over detector 103 layers (307 and 302). The resulting encapsulation of the graphene layer 307 and NC sensitizers 302 within the parylene insulating layer 301 provides protection of graphene from atmospheric OH⁻ radicals and other potential contaminants and can be useful for maintaining high charge carrier mobility and charge transfer efficiency of NC sensitizer 302. At step 404, parylene insulating layer 301 is etched for deposition of electrical conductors 201a, 201b and electrical connector 202. At step 405, electrical conductors 201a, 201b for the detector source and drain, electrical connector 202, and conductive anode 309, which is part of emitter 104, are deposited and patterned. Electrical connector 202 forms the connection between detector 103 and conductive anode 309 of OLED emitter 104. At step 406, the OLED emitter stack, comprising hole transporting layer 304, emissive layer 306, electron transport layer 305, and transparent conducting cathode 308, is deposited over electrical connector 202, conductive anode 309, and insulating layer 301 using evaporation under high vacuum conditions. In some aspects, hole transporting layer 304 (sometimes called a hole injection layer) may be useful for providing compatibility between NC sensitizers 302 layer and emissive layer 306. In some embodiments, emissive layer 306 may be a green phosphorescent emitter to provide high quantum and luminous efficiency. Fabrication techniques may employ self-aligning microfabrication of detector 103 and emitter 104. Using this approach, the LED does not need to be patterned into discrete emitters; rather each emitter is defined by the conductive anode 309 connected to each detector 103. In some aspects, repeating steps 404 through 405 for each layer of conductors, more conductors 201a, 201b, electrical connector 202, and parylene insulating layer 301 are added to form a circular conductive anode 309 and its connection to detector 103.

Figure 5:
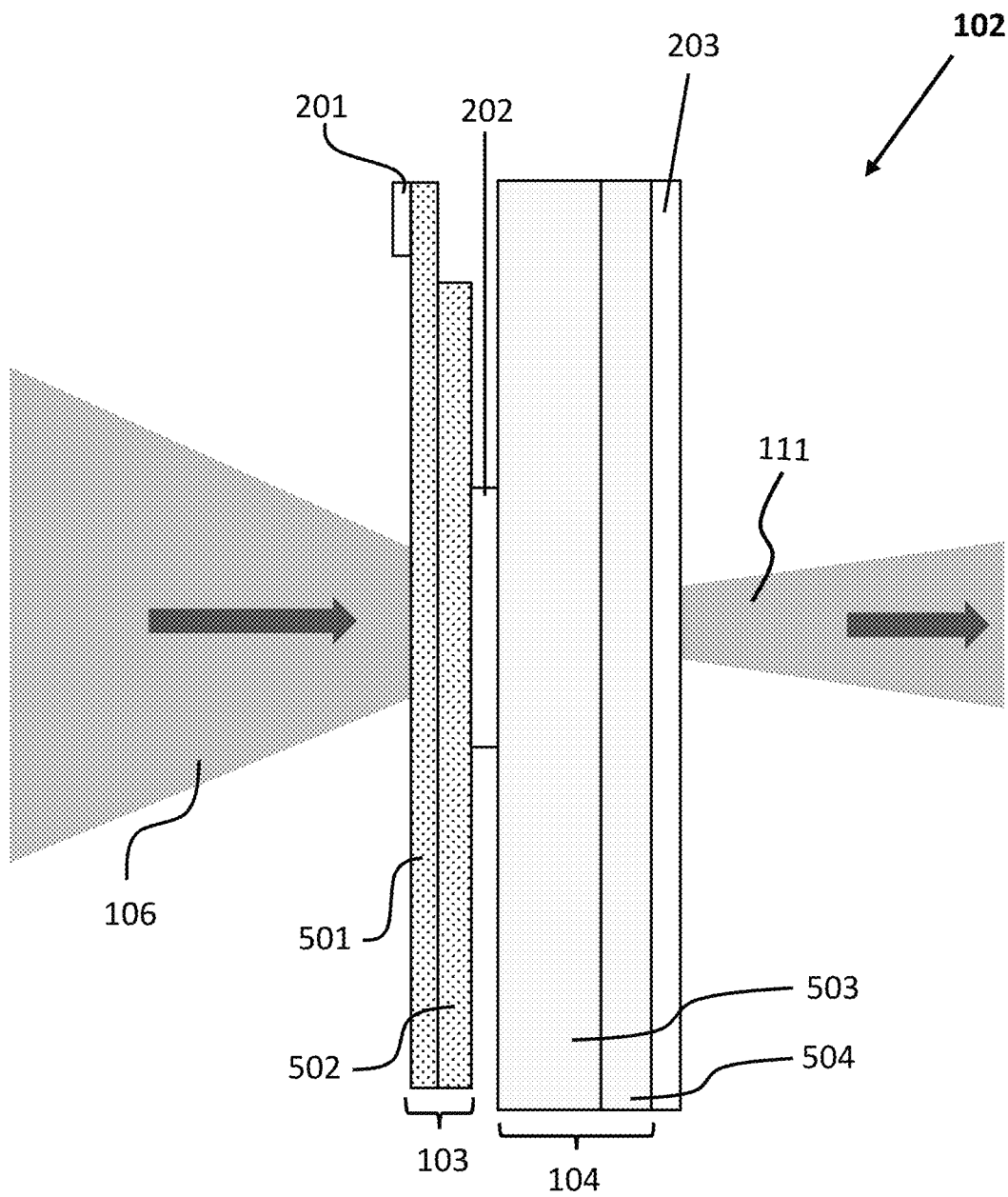
FIG. 5 shows an exemplary embodiment of a transducer having a semiconductor detector and an LED emitter.

FIG. 5 shows an exemplary embodiment of a transducer 102 having a semiconductor detector 103 and an LED emitter 104. In this embodiment, detector 103 is a semiconductor p-n junction diode, and emitter 104 is an inorganic LED and comprises inorganic semiconducting materials. Detector 103 may comprise p-type semiconducting material 501 indium gallium nitride (InGaN) and n-type semiconducting material 502 InGaN. In this aspect, emitter 104 is an inorganic LED emitter comprising p-type aluminum gallium arsenide (AlGaAs) 503 and n-type AlGaAs 504 layers of semiconducting material. Electrical connector 202 is positioned between detector 103 and emitter 104. In some aspects, detector 103 and emitter 104 may be made from silicon or other semiconductors.

In some embodiments, as in FIG. 1B and FIG. 1C, collimating output optic 108 comprises collimating lens 110 and spacer 109. Spacer 109 can comprise a polymer or other transparent material. In some aspects, spacer 109 is optional, and collimating optics may comprise collimating lens 110 without spacer 109. In some aspects, a collimating lens 110 may be separated by a void from emitter 104 of corresponding transducer 102. A collimating lens can be positioned at a selected distance from emitter 104 and separated by a void that functions as a spacer 109. In some aspects a void that functions as spacer 109 may be filled with a gas, such as for example air, nitrogen, argon, or other gas. Collimating lens may be secured at a selected distance from emitter 104 by transducer-output optic baffles 113. Typically, the direction of travel of substantially collimated light 114 is determined by collimating lens 110, which emits substantially collimated light 114 such that the substantially collimated light 114 has a direction of travel that is substantially the same as the direction of travel of the at least one selected portion 106 of incident light field 107 that is focused to the single transducer 102 in subset 105.

Collimating lens 110 may be a conventional microlens, a metalens such as a dielectric meta-optic, or another type of low aberration collimating lens. In some embodiments, a meta-optic collimating lens 110 may comprise an array of subwavelength structures that control the phase shift of transmitted light. A gradient phase shift across the clear aperture of collimating lens 110 may be controlled by engineering the geometry of the subwavelength structures at each point across the clear aperture of collimating lens 110. For example, an array of nanodimensional subwavelength structures that are cylindrically shaped may be useful for determining a local phase shift based on the widths of the cylindrically shaped subwavelength structures. The overall gradient phase shift can convert diverging transduced light 111 into a collimated beam of emitted light 114.

In some embodiments, conversion of an incident IR light field 107 to an emitted VIS light field 118, using light field relay 100 enables the formation of an image of the original IR light field 107 or scene. The substantial collimation of transduced light 111 can be useful for enhancing quality of the perceived image based on emitted light field 118. In some embodiments, transduced light 111 emitted by emitter 104 is often diverging light. It is typically desirable that collimating lens 110 reduce divergence of transduced light 111 that enters output optic 108. In many aspects, it is desirable that divergence be reduced to less than approximately 2° full cone angle to achieve effective reconstruction of incident IR light field 107. In some aspects, if collimated light 114 is poorly collimated by collimating lens 110, visible blur and degradation of the perceived modulation transfer function (MTF) are possible. In some aspects, collimation of transduced light 111 may be enhanced by configuring light field relay 100 with an emitter 104 that comprises a plasmonic lens 203 as the emitter output and with an output optic 108 comprising a dielectric meta-optic collimating lens 110, wherein both plasmonic lens 203 and dielectric meta-optic collimating lens 110 comprise high-transmittance, polarization-independent metasurfaces.

Typically, light field relay 100 operates directly on incident light 107 without an intermediate image plane and without re-imaging incident light field 107. Rather, light field relay 100 samples selected portions 106 of incident light field 107, transduces the selected portions 106 to produced transduced light 111, substantially collimates transduced light 111 and emits substantially collimated light 114 as part of emitted light field 118. In many embodiments, selected portions 114a, 114b, 114c of substantially collimated light emitted by a corresponding output optic 108 represent portions of emitted light field 118, wherein each selected portion of substantially collimated light 114 is derived by light field relay 100—mediated conversion of a corresponding selected portion (e.g., 106a, 106b, or 106c respectively) of incident light field 107. In many embodiments, a plurality of selected portions of substantially collimated light 114 contribute to emitted light field 118, and a selected portion of substantially collimated light 114 comprises light having wavelengths different from the wavelengths of light in the corresponding selected portion 106 of incident light field 107. In many embodiments, light field relay 100 is configured such that an output optic 108 emits a plurality of selected portions of substantially collimated light 114 that contribute to emitted light field 118, wherein each selected portion of substantially collimated light 114 has a direction of travel that is substantially the same as the direction of travel of a corresponding selected portion 106 of incident light field 107 and has an irradiance that is amplified in comparison to the irradiance of the corresponding selected portion 106 of incident light field 107.

Figure 6A:
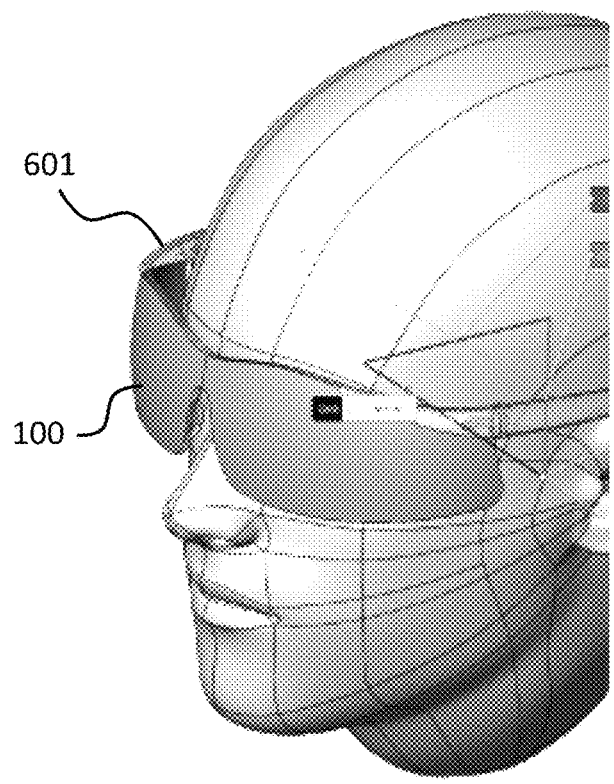
FIGS. 6A-6B show an exemplary embodiment in which a light field relay is incorporated into eyewear.
Figure 6B:
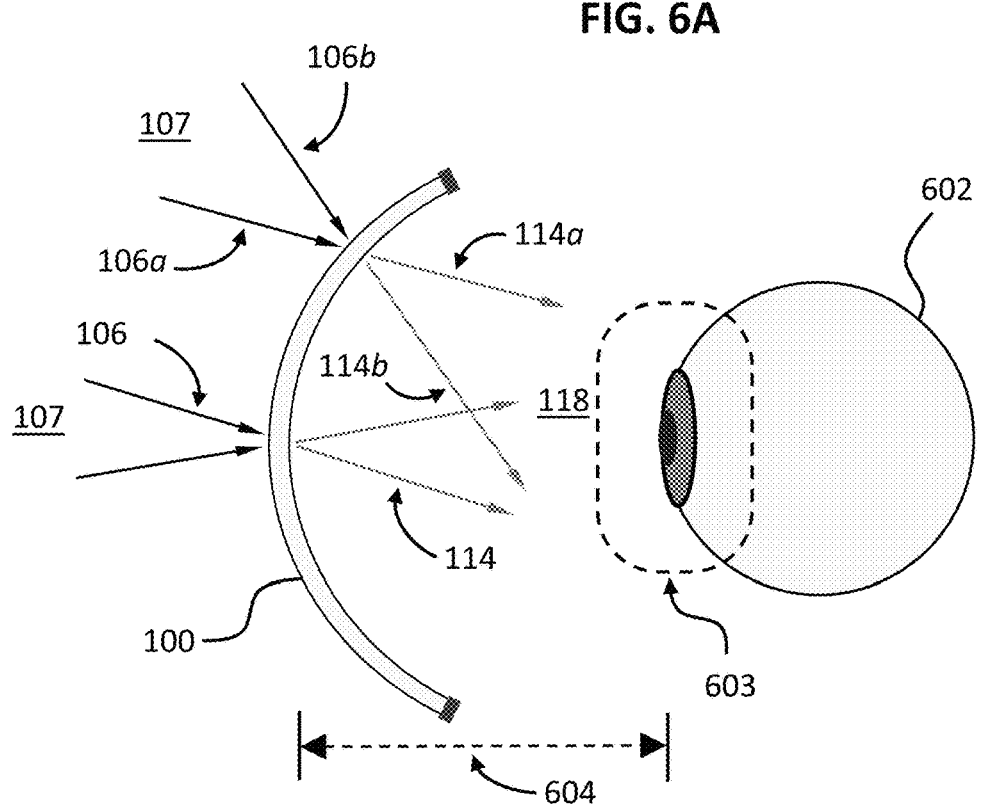

Light field relay 100 may be used in any of numerous applications, such as for example a window. In some embodiments, light field relay 100 may be incorporated into an article of eyewear 601 such as night vision glasses (NVG) or another optical instrument. FIGS. 6A-6B show an exemplary embodiment in which light field relay 100 is incorporated into eyewear. In this exemplary embodiment, eyewear 601 comprises light field relay 100 that is configured to focus one or more selected portions 106 of incident light field 107 to a corresponding subset of transducers 102, the selected portions representing an infrared (IR) light-field, to transduce the IR light-field to VIS transduced light 111, and to substantially collimate and emit VIS light 114 as a VIS light field 118 for re-projection and/or direct viewing by a user's eye 602. Substantially collimated VIS light 114 emitted by an output optic 108 will have a direction of travel that is substantially the same as the direction of travel of the single selected portion 106 of IR light in incident light field 107 focused to a single associated transducer 102 and will have an irradiance that is amplified in comparison to the irradiance of the single selected portion 106 of IR light. In some embodiments then, light field relay 100 may enable conversion of an incident IR light field 107 to a VIS emitted light field 118, which can be used by eye 602 to form an image of the original IR light field 107 or scene.

In some embodiments, light field relay 100 may be capable of representing IR light from two or more IR spectral bands to the eyewear user as two or more colors of VIS light in emitted light field 118. By way of example, incident IR light from different IR spectral bands can be transduced to appear to an eyewear user as different colors of VIS light, by interlacing different types of NC sensitizers 302 in emitter 104. For example, green and orange OLEDs in emitter 104 may be driven by shorter- and longer-wavelength IR radiation, respectively. In some aspects, a two-color checkerboard mosaic may be one straightforward approach to achieve the VIS color reconstruction.

In some embodiments of eyewear 601, microlenses 101 may be made of shatter-resistant plastic, such as for example polycarbonate, which can be injection-molded. Plastic optics can provide for lighter-weight eyewear and can be more easily shaped into a practical eyewear form than optics made from other materials like glass. In some aspects, eyewear 601 may be flexible and can comprise flexible OLEDs. In some aspects, eyewear 601 comprising a light field relay 100 made with graphene detectors, OLED emitters, and plastic components (e.g., microlenses and output optics) can be more easily ruggedized and made to be resistant to environmental stresses and can be useful over a wide range of environmental temperatures.

In some applications, gate conductor 303 may be useful for preventing backscatter of VIS light to detector 103 from eye 602, output optic 108, and/or emitter 104. By way of example, an opaque gate conductor 303 may be positioned between detector 103 and an LED emitter 104 material stack. In some aspects, VIS light in emitted light field 118 that may be backscattered from eye 602 may be prevented from exiting through the front side of light field relay 100 by the use of microlenses 101 coated with an IR-pass filter.

Light field relay 100 can be effective for relaying light collected from a relatively wide FoV. In some aspects, light field relay 100 for use with eyewear 601 can be configured so that focused portions 106 are collected from a limited range of angles and such that substantially collimated VIS light 114 in emitted light field 118 contributes to the exit pupil 603 in front of eye 602. Higher image resolution may be more easily achieved as the size of exit pupil 603 decreases. In some embodiments, exit pupil 603 can be reduced in size by reducing the number of transducers 102 coupled to microlens 101. In some aspects, higher image resolution may also be more easily achieved as the size of the exit pupil distance 604 increases, which may allow for larger microlenses 101 but can increase size and weight of eyewear 601. In some embodiments of eyewear 601 comprising light field relay 100, exit pupil distance 604 is on the order of centimeters. For the exemplary eyewear embodiment shown in FIGS. 6A-6B, exit pupil distance 604 may be about 5 cm. Exit pupil distance 604 typically varies depending on the shape, size, and application of light field relay 100. Exit pupil distance 604 may be on the order of millimeters or micrometers. For example, eyewear 601 may be configured as a contact lens that comprises light field relay 100 and is suitable for contact with eye 602. In yet another example, light field relay 100 that is a virtual window may be positioned at a greater distance from exit pupil 603, such as for example from about one to many meters away from exit pupil 603.

The irradiance of emitted light field 118 may be amplified in comparison to the irradiance of incident light field 107. Substantially collimated light 114 emitted by an output optic 108 may have an irradiance that is amplified in comparison to the irradiance of the single selected portion 106 of incident light field 107 focused to the single, corresponding transducer 102. In some embodiments however, the amplification factor may be less than 1, for example when the irradiance of substantially collimated light 114 emitted by a corresponding output optic 108 is intentionally reduced relative to the irradiance of the single selected portion 106 of incident light field 107 focused to the associated transducer 102. For example, when light field relay 100 is positioned to be facing a bright light source such as the sun, it may be beneficial to intentionally reduce or suppress the irradiance of substantially collimated light 114 emitted by output optic 108, so as to prevent damage to the eye of a user. In these exemplary aspects then, irradiance of substantially collimated light 114 emitted by an output optic 108 is not amplified in comparison to the irradiance of the single selected portion 106 of incident light field 107 focused to corresponding transducer 102. In some aspects, e.g., in standard night vision applications, the amplification factor may be greater than 1, such that substantially collimated light 114 emitted by an output optic 108 has an irradiance that is amplified in comparison to the irradiance of the single selected portion 106 of incident light field 107 focused to the single associated transducer 102. In some aspects, the amplification factor may be a complicated function of incident light irradiance, such as a logarithmic amplification, to provide useful contrast in scenes with large dynamic ranges, or to compensate for detection nonlinearities in human vision.

Many existing NVG formats fail to provide full accurate depth cues. Binocular NVGs can provide the important depth cue of convergence but often exhibit vergence-accommodation conflict (VAC), in which two powerful depth cues are mismatched due to the forced focusing of the eye on a flat phosphor screen. In practice, with light field relay 100 the directional aspects of light in selected portions 106 are preserved in substantially collimated light 114 of emitted light field 118, thus supporting all available depth cues without VAC, as is the case for normal unaided human vision. In some aspects, for example with a monocular NVG system, the accommodation depth cue can be stimulated, in which the eye 602 focuses at different scene depths. In some aspects, such as for example with a binocular NVG, other powerful depth cues are supported, particularly convergence and binocular disparity or stereopsis, without VAC.

In some embodiments, eyewear 601 may comprise light field array 100 wherein microlenses 101 collect selected portions 106 from a range of angles that is about 6°, independent of overall FoV. For these parameters, light field relay 100 may be manufactured to take a curved shape or a spherical shape with its center at exit pupil 603, as is shown in FIG. 6B. In some aspects, light field relay 100 may comprise a plurality of light field relays 100 having a planar configuration. The plurality of planar-shaped light field relays 100 may be positioned adjacent to one another so as to assemble a larger, composite light field relay 100 that approximates a larger curved surface.

In some aspects, light field relay 100 that is incorporated into eyewear 601 need not be so curved as to be spherical.

Other shapes are compatible with light field relay 100 including planar and curved. A curved light field relay 100 may be compatible with the shapes of typical eyewear, including sunglasses and safety glasses, in addition to other conventional eyewear. In some embodiments, light field relay 100 may have a combination of a curved microlens array 115 comprising offset microlenses 101. An offset configuration for microlenses 101 can provide a planar arrangement that is sufficient to cover an ~60° FoV with sufficient alignment of each microlens 101 and corresponding collimating output optic 108 for directing substantially collimated light 114 to exit pupil 603. In some aspects, each offset microlens 101 may have an off-center curvature that results in substantially collimated light 114 being directed off axis. A microlens array 115 having offset microlenses 101 can be custom fabricated using greyscale mask microfabrication methods. In some embodiments, light field relay 100 may comprise microlens array 115 of offset microlenses 101 with an array curvature that enables collecting light over an ~100° FoV, which can result in a more ergonomic eyewear 601 design. In some aspects, front sides of microlenses 101 may be curved to ensure that emitted substantially collimated light 114 contributes to exit pupil 603.

In some aspects, light field relay 100 may comprise a plurality of light field relays 100 that form a polyhedral configuration. By way of example only, a plurality of light field relays 100 may be positioned adjacent to one another so as to assemble a larger, hexagonally shaped light field relay 100. A plurality of these hexagonally shaped, or other polyhedrally shaped light field relays 100 may be positioned adjacent to one another to assemble an even larger light-field relay 100. A plurality of polyhedrally shaped light field relays may be assembled into a larger light field relay 100 that can take any of a variety of shapes. By way of example only, a light field relay 100 may be assembled from a plurality of smaller polyhedrally shaped light field relays 100 so as to substantially enclose an eye 602 of eyewear 601 user. In some aspects, light field relay 100 may be assembled from a plurality of smaller polyhedrally shaped light field relays 100 having substantially the same polyhedral shapes as one another and configured as planar in configuration, such that the light relays in the plurality are aligned to transmit light field 118 to exit pupil 603.

It is specifically contemplated that embodiments of the disclosure may comprise elements described herein in various different combinations and numbers. In embodiments of the disclosure, not all elements or types of elements need be the same or have the same characteristics or parameters. Other objects, features, and advantages of the embodiments described herein will become apparent from the detailed description. It should be understood, however, that the detailed description and the specific examples, while indicating specific embodiments, are given by way of illustration only, since various changes and modifications within the spirit and scope of the disclosure will become apparent to those skilled in the art from this detailed description.

What is claimed is:

1. A light field relay comprising:
 a plurality of microlenses;
 a plurality of transducers, wherein each microlens in the plurality of microlenses is coupled to a corresponding different subset of the plurality of transducers and is configured to focus one or more selected portions of an incident light field to the corresponding different subset, and wherein each transducer in the corresponding different subset is positioned and configured to receive and transduce light from a single selected portion of the one or more selected portions of the incident light field focused by the coupled microlens and comprises a detector electrically coupled to an emitter, the detector being positioned between the coupled microlens and the emitter; and,
 a plurality of output optics, each output optic in the plurality of output optics comprising a collimating lens, wherein each transducer in the corresponding different subset is associated with a corresponding different output optic in the plurality of output optics, the corresponding different output optic being positioned to receive transduced light from the emitter of the associated transducer and configured to substantially collimate the received, transduced light and to emit the substantially collimated light, and wherein the substantially collimated, emitted light has a direction of travel that is substantially the same as the direction of travel of the single selected portion and has an irradiance that is amplified in comparison to the irradiance of the single selected portion.

2. The light field relay of claim 1, wherein adjacent microlenses in the plurality of microlenses are separated by a baffle.

3. The light field relay of claim 1, wherein adjacent transducers in the plurality of transducers and/or adjacent output optics in the plurality of output optics are separated by a baffle.

4. The light field relay of claim 1, wherein the emitter of each transducer in the plurality of transducers further comprises a plasmonic lens.

5. The light field relay of claim 1, wherein the collimating lens of each output optic in the plurality of output optics is a dielectric meta-optic comprising an array of subwavelength structures.

6. The light field relay of claim 1, wherein each output optic in the plurality of output optics further comprises a spacer positioned between the collimating lens and the emitter of the associated transducer.

7. The light field relay of claim 1, wherein the substantially collimated, emitted light is an emitted light field.

8. The light field relay of claim 7, wherein the emitted light field comprises VIS light.

9. The light field relay of claim 1, wherein the emitter of each transducer in the plurality of transducers is an LED.

10. The light field relay of claim 9, wherein the detector of each transducer in the plurality of transducers comprises a graphene layer.

11. The light field relay of claim 10, wherein the detector of each transducer in the plurality of transducers further comprises a layer of nanocrystal sensitizers coupled to the graphene layer.

12. The light field relay of claim 11, wherein each transducer in the plurality of transducers further comprises a gate conductor positioned between the detector and the emitter.

13. The light field relay of claim 11, wherein the nanocrystal sensitizers comprise one or more than one of nanoparticles, colloidal quantum dots, or other thin film structures configured to absorb IR light.

14. The light field relay of claim 13, wherein each transducer in the in the plurality of transducers is configured to transduce the IR light to VIS light.

15. The light field relay of claim 14, wherein the nanocrystal sensitizers comprise PbS and/or PbSe.

16. The light field relay of claim 14, wherein the nanocrystal sensitizers comprise InAs and/or $Ti_2O_3$.

17. The light field relay of claim 14 wherein the LED is an OLED.

18. An article of eyewear comprising the light field relay of claim 1.

19. A method of fabricating a light field relay of claim 1, the method comprising:
- depositing a layer of graphene on a parylene-coated glass substrate;
- depositing a layer of nanocrystal sensitizers on the graphene layer;
- patterning the graphene layer and the nanocrystal sensitizer layer;
- depositing a parylene insulator layer over the patterned graphene and nanocrystal sensitizer layers;
- etching the deposited parylene insulator layer;
- depositing and patterning one or more than one electrical conductor, one or more than one electrical contact, and a conductive anode;
- depositing an OLED emitter stack over the one or more than one electrical contact, the conductive anode, and the parylene insulator; and,
- depositing a transparent cathode over the OLED emitter stack.

* * * * *